May 24, 1966  R. D. HANSEN ETAL  3,252,921

HIGH STABILITY PARTIALLY SULFONATED CATION EXCHANGE RESINS

Filed March 18, 1965

INVENTORS.
Lawrence E. McMahon
Robert D. Hansen
BY
L. S. Jovanovitz
ATTORNEY

United States Patent Office 3,252,921
Patented May 24, 1966

3,252,921
HIGH STABILITY PARTIALLY SULFONATED
CATION EXCHANGE RESINS
Robert D. Hansen and Lawrence E. McMahon, Midland, Mich., assignors to The Dow Chemical Company, Midland, Mich., a corporation of Delaware
Filed Mar. 18, 1965, Ser. No. 440,721
7 Claims. (Cl. 260—2.2)

This application is a continuation-in-part of our copending application, Serial No. 191,888, filed May 2, 1962.

This invention concerns sulfonated cation exchange resins possessing high physical stability and their method of preparation. It pertains especially to a method for partially sulfonating insoluble copolymers of a major proportion of a monovinyl aromatic compound and a minor proportion of a polyvinyl aromatic compound. The invention is concerned more particularly with a method of producing such partially sulfonated copolymers in the form of spheroidal beads which are characterized by a spheroidal layer of sulfonated copolymer enveloping an inner non-sulfonated copolymer core.

Sulfonated cation exchange resins having substantially one sulfonate group per aromatic nucleus are well known as conventional cation exchange resins. These resins are commonly referred to as fully sulfonated or standard sulfonated cation exchange resins. Partially sulfonated cation exchange resins wherein the sulfonate groups are distributed substantially uniformly throughout the resin matrix are also known to the art.

Figure 1:
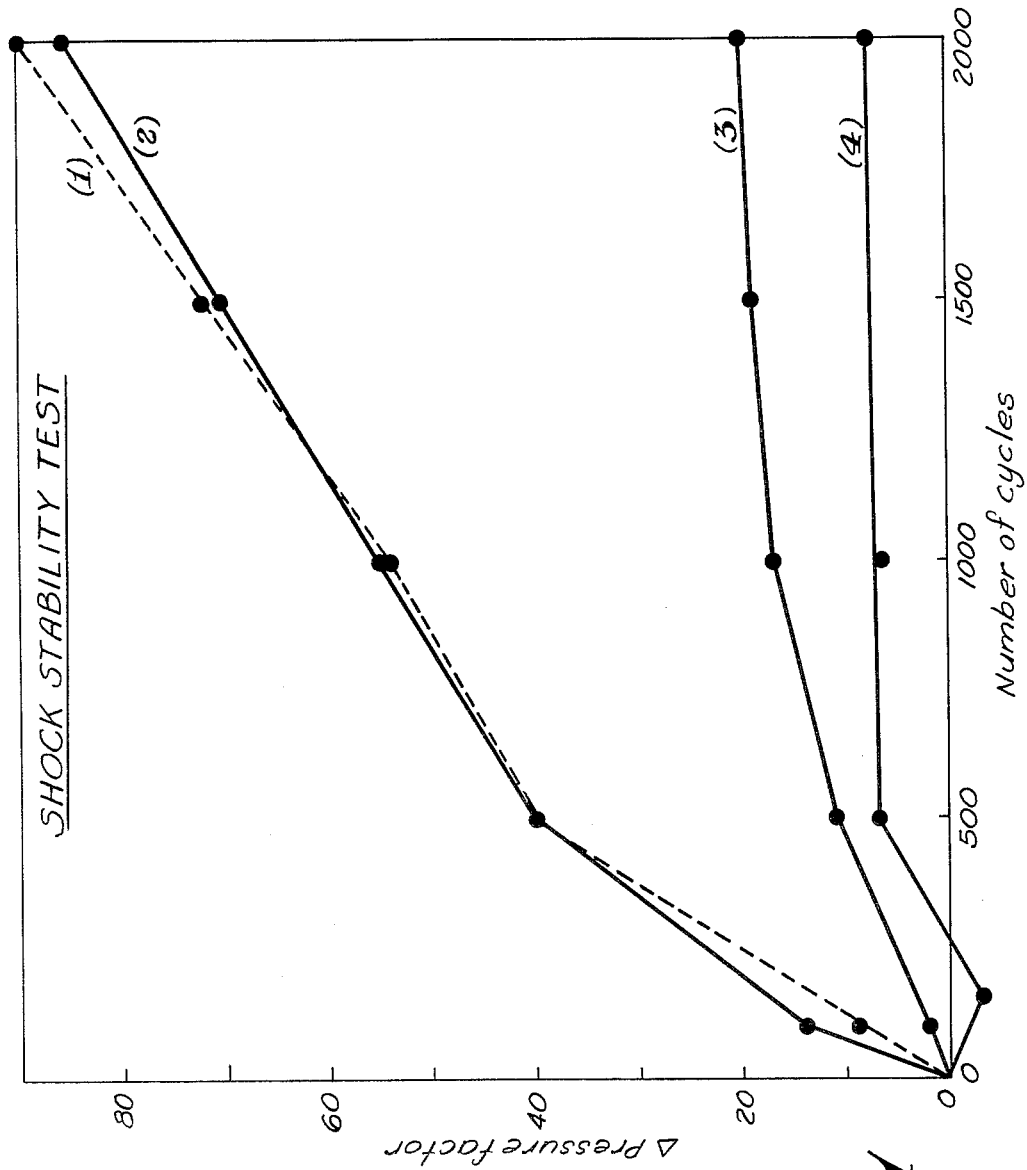

It has now been discovered in accordance with the present invention that partially sulfonated cation exchange resins can be prepared in the form of spheroidal resin beads which have a non-sulfonated core of substantial size enveloped by an outer sulfonated layer. This particular non-uniform distribution of the sulfonate groups in the resin is responsible for a surprising increase in physical stability over that of the uniformly sulfonated resins previously known. This increase in stability is illustrated by FIGURE 1 of the accompanying drawing as explained in Example 3, below. As a consequence of their markedly improved physical stability the particular non-uniformly sulfonated resins of this invention are especially valuable for use in ion exchange applications which place severe osmotic stresses on resins. The products of the present invention are not impaired by rapid cyclization between saturated sodium chloride solutions and water or by rewetting after drying which cause standard sulfonated resins to crack, spall or shatter.

In the method of this invention an insoluble copolymer, in spheroidal bead form, of a major proportion of a monovinyl aromatic compound and a minor proportion of a polyvinyl aromatic compound, is slurried with a liquid organic swelling agent which is also a solvent for the sulfonating agent. A quantity of sulfonating agent which is less than the amount necessary to provide one sulfonate group per aryl nucleus is added to the swollen copolymer slurry at a temperature of from about 0° to 40° C. and after approximately 30 minutes the liquid phase is removed. Concentrated electrolyte solution is then added to the partially sulfonated resin to facilitate distillation removal of the relatively volatile swelling agent remaining in the resin. This is accomplished by heating the slurry at about 90° C. for about one hour. Following the removal of the swelling agent, heating is discontinued and water is continuously added to the slurry to dilute the electrolyte solution which is continuously drained from the slurry. Aqueous washing is continued until the effluent stream is free of electrolyte. The amount of sulfonation is determined by a standard base titration of a portion of the partially sulfonated resin product.

Figure 2:
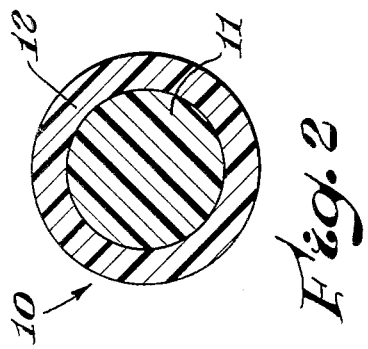

A graphic representation of a microscopic view of the partially and non-uniformly sulfonated resin bead products of this invention is depicted in FIGURE 2 of the accompanying drawing wherein a representative resin bead 10, is shown having a non-sulfonated core 11, of substantial size, surrounded by a sulfonated spheroidal layer 12. The core 11, and outer layer 12, are sharply separated at their interface by a narrow, dark boundary line. Microscopic examination of similar-size resin beads, prepared by the method of this invention, containing progressively lower percentages of sulfonate groups reveals a correlative increase in size of the core 11, and a corresponding decrease in size of the outer layer 12.

Suitable starting resins for making the partially and non-uniformly sulfonated cation exchange resins of this invention are the conventional polymeric alkenylaromatic resins crosslinked with from about 0.1 to 24 percent of a polyvinyl crosslinking agent copolymerizable therewith, of the type used in making conventional sulfonated cation exchange resins. These include, for example, resinous polymers of styrene, vinyltoluenes, vinylxylenes, vinylnaphthalenes, vinylethylbenzenes, α-methylstyrene, vinylchlorobenzenes, vinyldichlorobenzenes or mixtures thereof, crosslinked with crosslinking agents such as divinylbenzenes, divinyltoluenes, divinylxylenes, divinylnaphthalenes, divinylethylbenzenes, etc.

Suitable swelling agents for the polymeric alkenylaromatic resins are the liquid, sulfonation-resistant chlorinated hydrocarbons having a boiling point up to about 120° C., e.g., chloroform, methylene chloride, ethylene dichloride, 1,1,2-trichloroethane, cis-dichloroethylene, trichloroethylene, methyl chloroform, perchloroethylene, carbon tetrachloride, ethylidene dichloride, and the like.

Although various sulfonating agents are effectively employed in the preparation of conventional sulfonated cation exchange resins, sulfur trioxide and chlorosulfonic acid are most advantageously used in the preparation of the non-uniform, partially sulfonated resins of the present invention and of the two, chlorosulfonic acid is the preferred sulfonating agent.

Sufficient sulfonating agent is employed to sulfonate from about 8 to about 65 percent of the copolymer aryl groups. Sulfonation of a minimum of about 8 percent of the available copolymer aryl groups is necessary to provide the desired utility as an ion exchange resin. Although some uses may make a sulfonate content higher than 65 percent desirable, it is essential to the production of the highly physically stable cation exchange resins of this invention that the spheroidal beads have a non-sulfonated core of substantial size. This non-sulfonated core must contain a minimum of about 35 percent of the aryl nuclei in the spheroidal bead and sulfonation must be therefore limited to a surface volume, containing not more than about 65 percent of the total aryl nuclei, which forms a spheroidal layer surrounding the non-sulfonated core. As a consequence of this requirement, the sulfonation procedure must be carefully controlled in order to avoid sulfonation of more than that external portion containing about 65 percent of the total aryl groups. This is accomplished in the method of the present invention by the employment of a quantity of sulfonating agent which is less than the amount necessary to provide one sulfonate group per aryl nucleus which is in contradistinction to the large excesses of sulfonating agent employed in the preparation of standard sulfonated cation exchange resins.

The length of time required to achieve the desired degree of sulfonation is influenced by the temperature maintained, within the limits previously discussed. For example, maximum permissible sulfonation, i.e. 65 percent, is accomplished in not more than about 30 minutes when a temperature of about 25° C. is maintained during the sulfonation step with longer times required at lower temperatures. When lesser degrees of sulfonation are desired the required time for sulfonation is correspondingly less. A temperature range of from about 0° to 40° C. may be utilized with a range of about 20° to 35° C. being preferred.

The following examples describe completely specific embodiments of the method and products of this invention and set forth the best mode contemplated by the inventors for carrying out their invention.

EXAMPLE 1

A quantity of 400 grams of resinous copolymer beads, 20 to 45 U.S. standard mesh size, (prepared by suspension polymerization of 87 parts of styrene, 5 parts of ethylvinylbenzene and 8 parts of divinylbenzene) was slurried in 2,000 grams of methylene chloride at room temperature. After 25 minutes, 340 grams of chlorosulfonic acid was added to the swollen bead slurry over a period of 5 minutes. The subsequent mixture was maintained at a temperature of about 25° C. for 25 minutes and the liquid phase was then removed by filtration. A quantity of 1270 ml. of concentrated hydrochloric acid was slurried with the methylene chloride-swollen, partially sulfonated beads and 2.5 grams of n-octyl alcohol was added to serve as a defoaming agent. The temperature of the slurry was steadily raised by external heating to 90° C. and maintained at that temperature for one hour during which time the methylene chloride was removed by vaporization. After removal of the methylene chloride, heating was discontinued and water was added to the continuously stirred slurry at the rate of 110 ml./min. while acidic solution was continuously withdrawn at approximately the same rate. When 5 liters of water had been added in this manner, the resin was filtered and washed with water until the filtrate was no longer acidic. The wet volume capacity (bulk) of the product was 1.65 meq./ml. when titrated with standardized aqueous sodium hydroxide. The resin had a water content of 45 percent and a dry weight capacity of 3.72 meq./gram which represents approximately 57 percent sulfonation.

Similar results are obtained by substitution of an equivalent amount of sulfur trioxide in place of chlorosulfonic acid in the above procedure.

Microscopic examination of the particles showed that sulfonation had taken place only in an outer layer of the spheroidal copolymer beads leaving a non-sulfonated copolymer core of substantial size.

The physical stability was tested by cycling saturated sodium chloride solution and water through the resin. Virtually no cracking of the beads occurred. Samples prepared in accordance with this example also showed excellent resistance to cracking when the resin was oven dried at temperatures about 110° C. and then rewet with water.

EXAMPLE 2

A quantity of 50 grams of resinous copolymer beads, 20 to 45 U.S. standard mesh size, (prepared by suspension polymerization of 87 parts of styrene plus 5 parts ethylvinylbenzene and 8 parts of divinylbenzene) was slurried in 2500 grams of methylene chloride at room temperature. After 10 minutes, 100 grams of chlorosulfonic acid was added to the swollen bead slurry over a period of 5 minutes. The subsequent mixture was maintained at a temperature of about 20° C. for 10 minutes and the liquid phase was then removed by filtration. A quantity of 2500 grams of saturated NaCl solution was slurried with the methylene chloride-swollen, partially sulfonated beads and 2.5 grams of n-octyl alcohol was added to serve as a defoaming agent. The temperature of the slurry was steadily raised by external heating to 94° C. and maintained at that temperature for one and one-half hours during which time the methylene chloride was removed by vaporization. The slurry was then allowed to cool to about 60° C. and the beads were transferred to a filter and washed with water. The capacity of the product was 0.62 meq./gram of water-swollen resin beads when titrated with standardized sodium hydroxide. The resin had a water content of 1.43 percent and a dry weight capacity of 0.73 meq./gram, which represents approximately 8.3 percent sulfonation.

Microscopic examination of the particles showed that sulfonation had taken place only in a relatively narow outer layer of the spheroidal copolymer beads leaving a large non-sulfonated copolymer core.

The beads were virtually crack free as made. The physical stability of the beads was tested by placing oven dried (110° C.) beads in water, whereupon excellent resistance to cracking was observed.

FIGURE 1 of the accompanying drawing illustrates the high degree of physical stability of the partially and non-uniformly sulfonated cation exchange resin of the present invention as compared with the stability of a standard, commercially available, fully sulfonated cation exchance resin having substantially one sulfonate group per aromatic nucleus. This figure is explained more fully in Example 3, below.

EXAMPLE 3

Chemical shock stability of a number of sulfonated cation exchange resin test samples was measured by alternately subjecting each sample to contact with sulfuric acid (4 minutes) and water (6 minutes). The acid was employed in an aqueous solution concentration of 300 grams acid per liter. The resin was tested for breakage by screen analysis (U.S. Standard Mesh) at various intervals during a total of 2,000 such cycles. In order to assign an over-all numerical value to the particle size distribution as shown by such analysis, an empirical factor designated the "pressure factor" was devised. This factor was calculated by multiplication of the weight percent resin falling within a given particle size range by a weighted value for that size range and summation of the resulting products. Table I, below, shows the weighted value employed at various mesh ranges where a minus sign indicates passage of resin through the designated mesh screen and a plus sign indicates retention of resin on the designated mesh screen.

*Table 1*

(1)×(wt. percent resin+16 mesh)+
(2)×(wt. percent resin−16 mesh,+20 mesh)+
(4)×(wt. percent resin−20 mesh,+30 mesh)+
(6)×(wt. percent resin−30 mesh,+35 mesh)+
(8)×(wt. percent resin−35 mesh,+40 mesh)+
(16)×(wt. percent resin−40 mesh,+50 mesh)+
(32)×(wt. percent resin−50 mesh,+200 mesh)=pressure factor.

Thus, for example, the amount of resin (wt. percent) passing through a 40 mesh screen but retained on a 50 mesh screen is multiplied by a weighted value of 16. The summation, i.e. pressure factor, was calculated for the iniital resin and after various number of cycles. FIGURE 1 shows the change in this value (Δ pressure factor) plotted on the ordinate which represents a change in particle size distribution (due to breakdown of resin from chemical shock) after the number of previously described $H_2SO_4$–$H_2O$ cycles indicated on the abscisso. Experience has shown that changes in this pressure factor from that of the original sample is a sensitive measure of ion exchange bead breakage. In FIGURE 1, lines (1) and (2) connect data points observed on samples from two separate batches of fully sulfonated cation ion exchange resins while lines (3) and (4) are plotted from data obtained from two separate batches of the partially sulfonated ion exchange resins of the present invention.

As shown by FIGURE 1, the fully sulfonated resin has continuous breakage over the 2,000 cycles of testing which is representative of the expected behavior of such resins. The partially and non-uniformly sulfonated resins of the present invention, however, show an early breakage, apparently corresponding to the number of strained beads present in the batch at the start, followed by a very small change in pressure factor indicating that subsequent breakage is minimal during the 2,000-cycle test.

We claim:

1. A method for making highly physically stable, water-insoluble, partially and non-uniformly sulfonated, resinous alkenylaromatic polymers in spheroidal bead form, said beads being characterized by a non-sulfonated polymer core of substantial size enveloped by a spheroidal layer of sulfonated polymer, which comprises:

(A) swelling a bead-form resinous alkenylaromatic polymer, crosslinked with about 0.1 to about 24 weight percent, resin basis, of a polyvinyl crosslinking agent, with a liquid sulfonation-resistant chlorinated hydrocarbon having a boiling point up to about 120° C.;

(B) mixing the resulting swollen polymer, at a temperature of from about 0° to 40° C., with a sulfonating agent selected from the group consisting of chlorosulfonic acid and sulfur trioxide (1) in an amount sufficient to provide from about 0.8 to 6.5 sulfonate groups for each 10 available aromatic nuclei.

(2) for a time sufficient to sulfonate only an outer spheroidal layer of said beads, said layer containing not less than eight percent and not more than sixty-five percent of the total available aromatic nuclei of said beads whereby said beads have a non-sulfonated polymer core, containing from about 35 to 92 percent of the available aromatic nuclei, enveloped by said spheroidal layer of sulfonated polymer.

2. The method of claim 1 wherein the liquid sulfonation-resistant chlorinated hydrocarbon is methylene chloride.

3. The method of claim 1 wherein the sulfonating agent is chlorosulfonic acid.

4. The method of claim 1 wherein the resinous alkenyl-aromatic polymer is that of styrene and the crosslinking agent is divinylbenzene.

5. The method of claim 1 wherein the temperature is about 25° C. and the sulfonating agent is chlorosulfonic acid in an amount sufficient to provide about 6.5 sulfonate groups for each 10 available aromatic nuclei during a sulfonation time of about 30 minutes.

6. A partially and non-uniformly sulfonated water-insoluble alkenylaromatic polymer having a sulfonate group on 8 to 65 percent of its available aromatic nuclei, said resinous polymer being cross-linked with about 0.1 to about 24 percent, resin basis, of a polyvinyl crosslinking agent, said crossliked resinous polymer being in spheroidal bead form characterized by a non-sulfonated polymer core containing from about 35 to 92 percent of the available aromatic nuclei and enveloped by a spheroidal layer of sulfonated polymer.

7. The product of claim 6 wherein the resinous alkenylaromatic polymer is that of styrene and the crosslinking agent is divinylbenzene.

References Cited by the Examiner

UNITED STATES PATENTS

| | | | |
|---|---|---|---|
| 2,500,149 | 3/1950 | Boyer | 260—79.3 |
| 2,945,842 | 7/1960 | Eichhorn | 260—79.3 |
| 3,102,782 | 9/1963 | Small | 260—2.2 |

OTHER REFERENCES

Hale: Nature, vol. 170, pp.150–152, July 1952.

WILLIAM H. SHORT, *Primary Examiner.*